United States Patent [19]

Capps

[11] Patent Number: 5,658,064
[45] Date of Patent: Aug. 19, 1997

[54] PORTABLE CASSETTE TAPE ILLUMINATOR

[76] Inventor: Robert Wayne Capps, 1675 N. Tram Rd., Vidor, Tex. 77662

[21] Appl. No.: 592,086

[22] Filed: Jan. 26, 1996

[51] Int. Cl.⁶ .................................................. G11B 33/06
[52] U.S. Cl. ............................. 362/86; 362/87; 362/253; 362/800
[58] Field of Search .................... 362/86, 87, 253, 362/800

[56] References Cited

U.S. PATENT DOCUMENTS

| | | | |
|---|---|---|---|
| 3,439,919 | 4/1969 | Laa | 274/4 C |
| 3,557,360 | 1/1971 | Aldridge | 240/2 |
| 3,638,955 | 2/1972 | Wada | 274/4 C |
| 4,779,170 | 10/1988 | Lockwood et al. | 362/86 |
| 4,914,545 | 4/1990 | Price | 362/155 |
| 5,188,448 | 2/1993 | Sivani et al. | 362/109 |
| 5,255,162 | 10/1993 | Kawamoto | 362/26 |

*Primary Examiner*—Ira S. Lazarus
*Assistant Examiner*—Alfred Basichas
*Attorney, Agent, or Firm*—John D. Gugliotta; David L. Volk

[57] ABSTRACT

A portable cassette tape illuminator is disclosed having a small light which is meant to be attached to items used in the dark such as a cassette tape player. The portable cassette tape illuminator consists of a small light bulb, small battery, electronic circuitry, two thin wires and a "touch" on/off switch. To utilize it in a cassette tape player, place the bulb end into the left side of the cassette tap receptacle and string the wires up to the player control buttons where it may be looped. When light is needed to change a tape, touch the on/off switch. The portable cassette tape illuminator also provides light for intricate areas of the tape player for cleaning.

8 Claims, 4 Drawing Sheets

PORTABLE CASSETTE TAPE ILLUMINATOR

BACKGROUND OF THE INVENTION

1. Field of the Invention

The present invention relates generally to illuminating devices and, more particularly, to a portable device for the local illumination of a cassette tape.

2. Description of the Related Art

In the related art, many methods of illuminating a localized area are well known. For example, in U.S. Pat. No. 5,255,162, issued in the name of Kawamoto, a lighting device for a grille of a car stereo is disclosed for use with a flush mounted car stereo.

And, in U.S. Pat. No. 5,188,448, issued in the name of Siriani et al, a night light is disclosed for the illumination of the keys of a remote control unit.

Also, in U.S. Pat. No. 4,914,545, issued in the name of Price, a cassette case light is disclosed for illuminating the titles of a plurality of cassettes stored in a container case.

And finally, in U.S. Pat. No. 3,557,360, issued in the name of Aldridge, an apparatus for illuminating the tape reels and spindle splines of a tape cassette is disclosed. Although the function performed by a device made in accordance with the Aldridge reference performs a function closest to that of the present invention, such a disclosure is not adaptable to portable or other uses.

Consequently, a need has been felt for providing an apparatus which can be attached to items used in the dark, such as a cassette tape player, to provide localized and targeted illumination.

SUMMARY OF THE INVENTION

Often people would like to have a small amount of light available at night without having to turn on an overhead light, lamp or flashlight. It is the primary objection of the present invention to provide a portable cassette tape illuminator for this purpose which can also be used without disturbing others when a small amount of light is needed.

Briefly described according to one embodiment of the present invention, a portable cassette tape illuminator is disclosed having a small light which is meant to be attached to items used in the dark such as a cassette tape player. The portable cassette tape illuminator consists of a small light bulb, small battery, electronic circuitry, two thin wires and a "touch" on/off switch. To utilize it in a cassette tape player, place the bulb end into the left side of the cassette tape receptacle and string the wires up to the player control buttons where it may be looped. When light is needed to change a tape, touch the on/off switch. The portable cassette tape illuminator also provides light for intricate areas of the tape player for cleaning.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
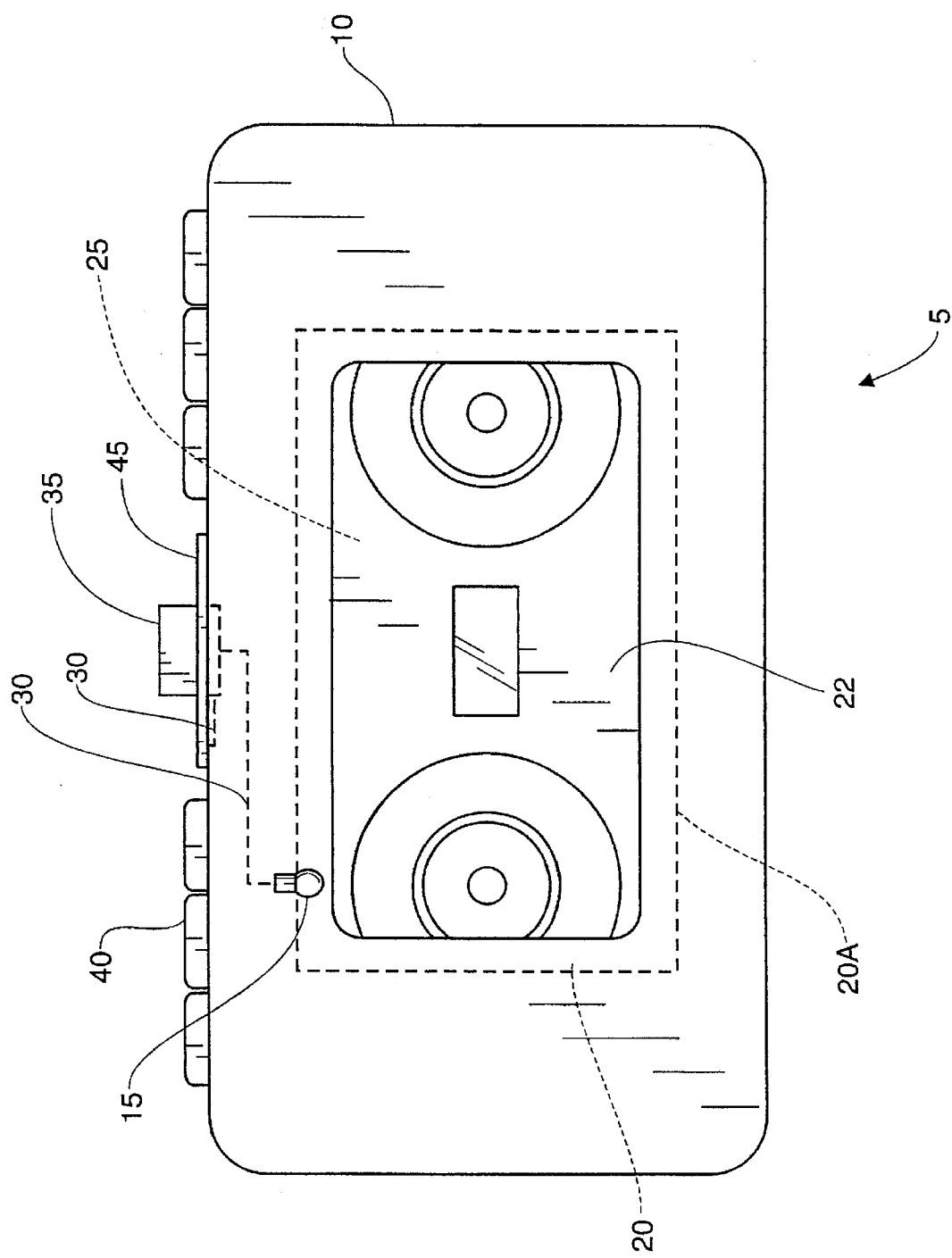
FIG. 1 is a perspective view of a portable cassette tape illuminator, according to the preferred embodiment of the present invention.

Referring now to FIG. 1, a portable cassette tape illuminator 5 is shown, according to the preferred embodiment of the present invention. A typical standard portable cassette player 10 is provided upon which all other components are mounted. A light bulb 15 is mounted inside the cassette tape well 20 to serve illumination while changing or playing a cassette tape 25. It is envisioned that the light bulb 15 be of an extremely small physical size capable of providing uniform illumination with the minimum amount of electric power. It is anticipated that a type of light bulb commonly referred to as a "wheat" bulb be utilized, though those familiar in the art can easily envision other types of bulbs being used. A tape well window 22 covers the tape well 20. A tape well lip 20A is disposed about the perimeter of the tape well 20. A slender, elongated ribbon cable assembly 30, extremely small in size and thin, provides an electrical path between the light bulb 15 and a component housing 35 which is mounted on the typical standard portable cassette player 10 near a control selector panel 40. The components of the component housing 35 will be described in greater detail below. Also located on the typical standard portable cassette player 10 near the control selector panel 40 is a light control touch switch 45. The light control touch switch 45, when touched anywhere along its main axis length, provides current to the light bulb 15 and associated illumination of the cassette tape well 20. The light control touch switch 45 connected to the component housing 35 with a ribbon cable assembly 30 also. While this disclosure depicts the present invention in use with a typical standard portable cassette player, it can be easily seen by those familiar in the art, that the present invention could easily be adapted to be used with other portable entertainment systems such as compact disc players and the like. Additionally, while this disclosure depicts an add-on apparatus, it is envisioned that the invention could easily be adapted into the original device manufacturing process.

Figure 2:
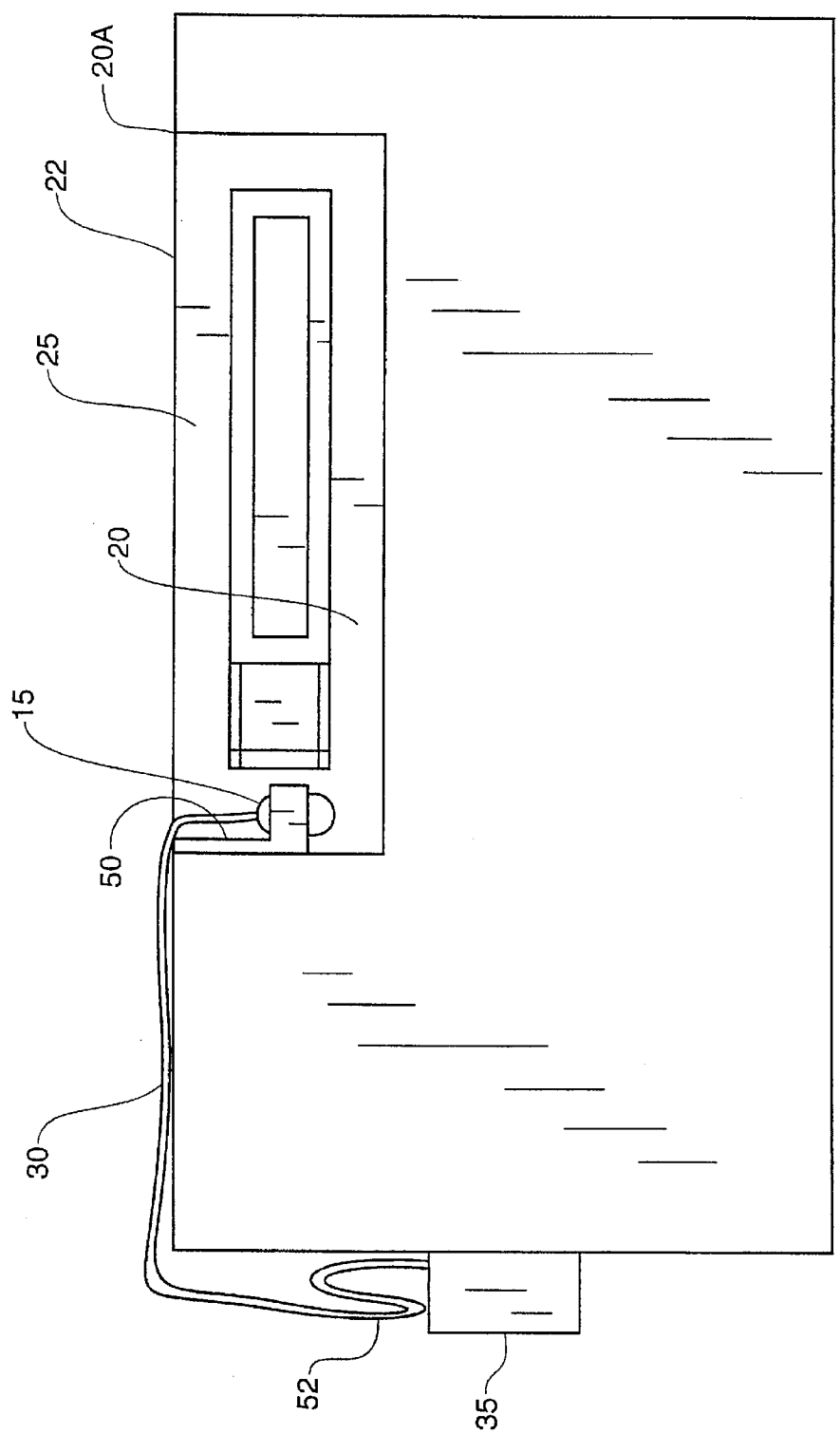
FIG. 2 is a cross sectional view of the present invention as taken along a line I—I in FIG. 1.

Referring now to FIG. 2, a cross sectional view of the light bulb 15 is shown along a line I—I taken in FIG. 1. A mounting clip 50 provides a mechanical fastening means to attach the light bulb 15 to the cassette tape well 20. The mounting clip 50 also provides a means to retain the ribbon cable assembly 30 out of the path of insertion or removal of the cassette tape 25. The cable assembly 30 passes between the tape well window 22 and the tape well lip 20A into the tape well 20 when the window 22 is in a closed position, covering the tape well 20. A loop 52 provides strain relief before connection of the ribbon cable assembly 30 to the component housing 35.

Figure 3:
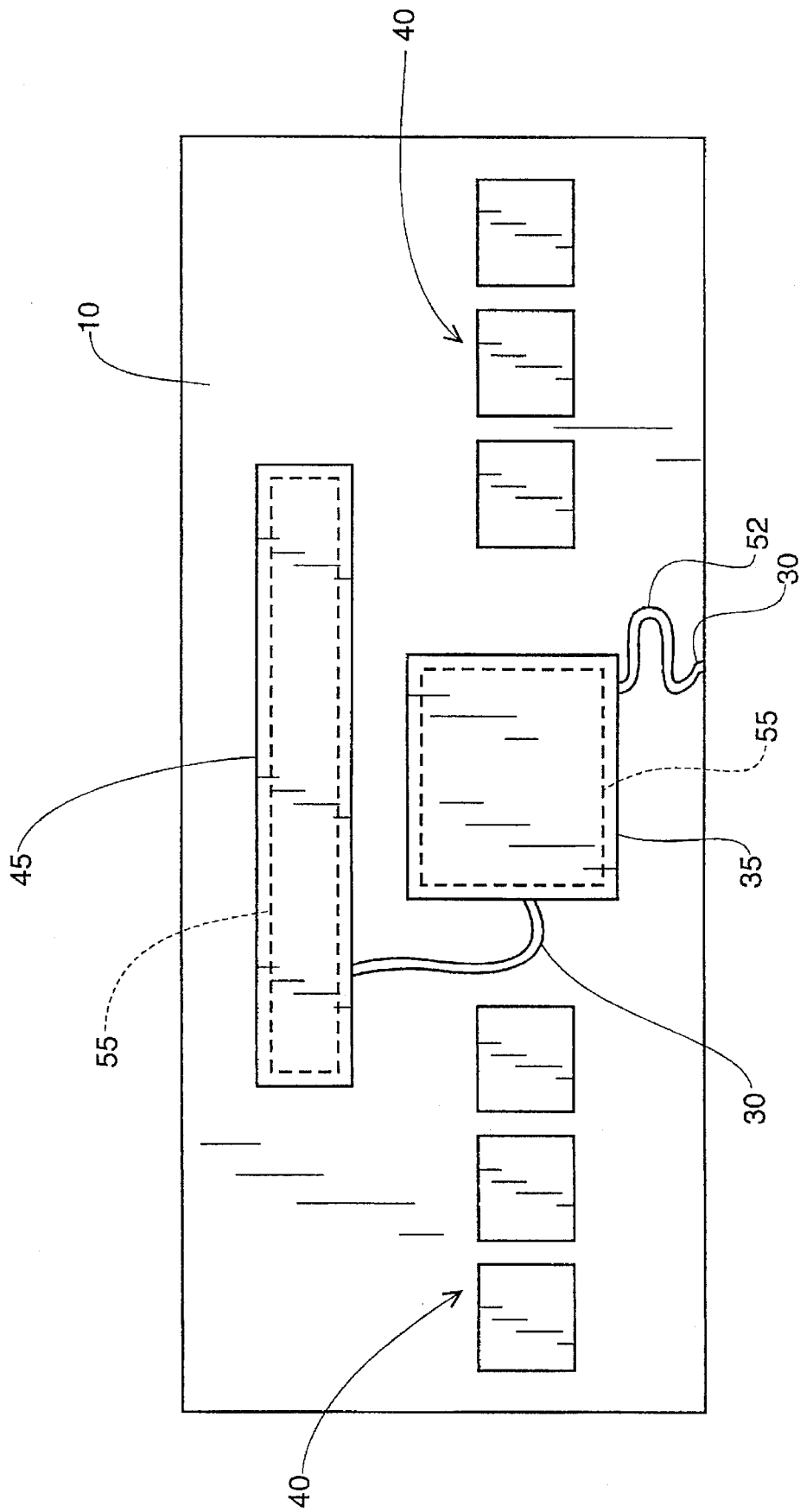
FIG. 3 is a top view of the present invention.

Referring next to FIG. 3, a top view of the present invention is shown. The light control touch switch 45 is mounted to a flat, even portion of the typical standard portable cassette player 10 next to the control selector panel 40. The light control touch switch 45 and the component housing 35 are held in firm mechanical contact with the typical standard portable cassette player 10 via a double sided adhesive tape strip 55. Although not disclosed in the preferred embodiment of the present invention, it is envisioned that an additional light bulb could be added in this physical area to provide illumination of the cassette player controls. The ribbon cable assembly 30 with its associated loop 52 connecting the component housing 35 to the light bulb 15 (not shown) is also provided in this physical location. Also, disclosed the ribbon cable assembly 30 connecting the component housing 35 and the light control touch switch 45 together.

Figure 4:
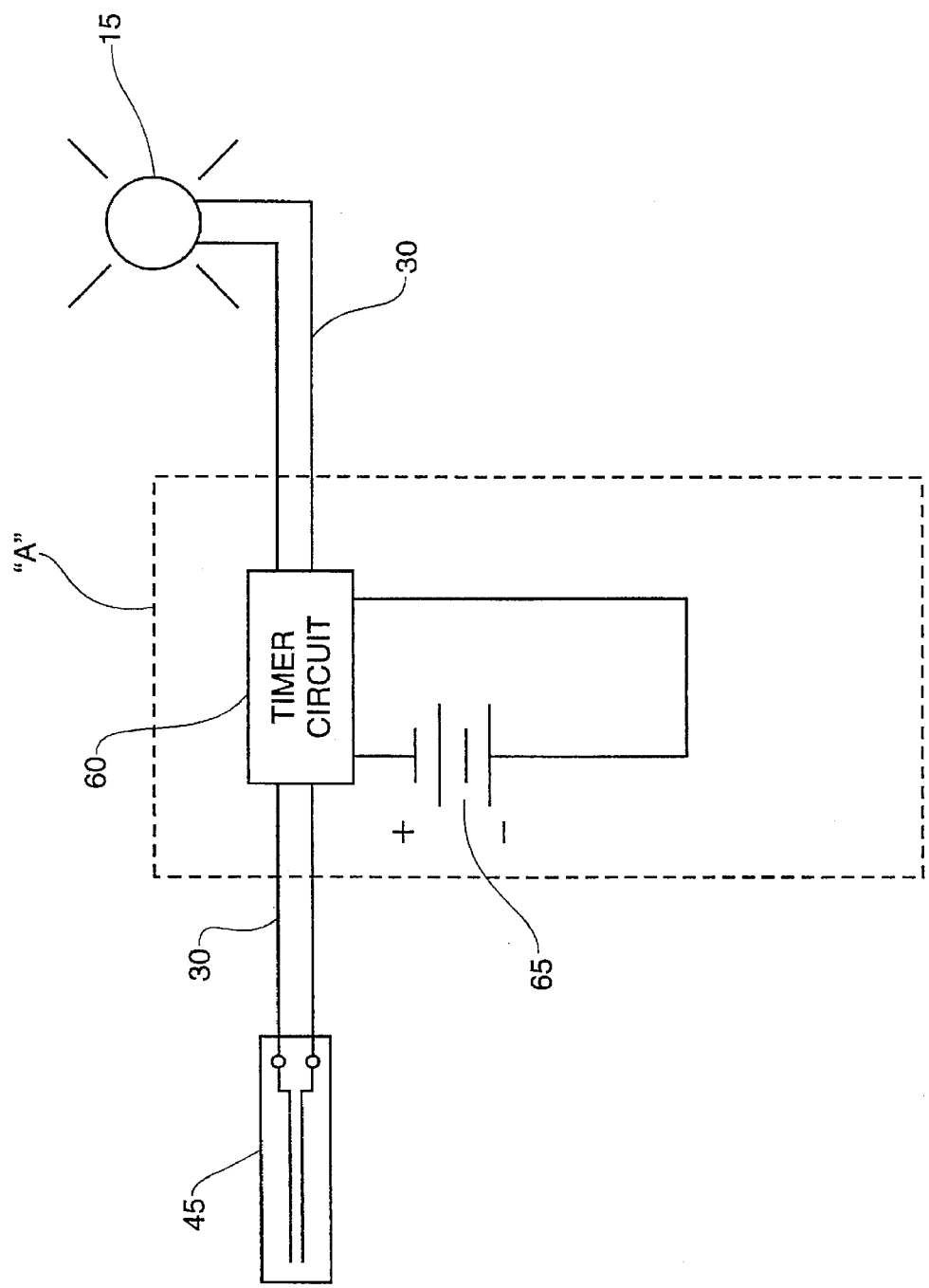
FIG. 4 is a functional block diagram depicting the major electrical components of the present invention.

Referring finally to FIG. 4, a functional block diagram depicting the major electrical components of the present invention is shown. The component housing 35 (not shown) is depicted by a dashed line box "A". Contained within the component housing 35 (not shown) are a timer circuit 60 and a battery 65. The battery 65 is envisioned to be a small "watch" type battery which could be easily replaced by the common user. The timer circuit 60 deactivates the light bulb 15 after a preset time period, envisioned to be approximately 45 to 50 seconds. This time period serves to prevent an excessive draw of current from the battery 65, in the event of inadvertent activation of the light control touch switch 45.

2. Operation of the Preferred Embodiment

In operation, the present invention can be utilized by the common user in a simple and effortless manner. To use the present invention with its preferred embodiment can best be described in conjunction with the use of the perspective view of FIG. 1, the cross-section of FIG. 2, the top view of FIG. 3, and the functional electrical block diagram of FIG. 4.

A user, upon wishing to insert, remove, or rotate an audio cassette tape under inadequate lighting conditions, would first activate the portable cassette tape illuminator 5 on a typical standard portable cassette player 10 by pressing down on the light control touch switch 45 with one of his or her fingers. The activation of the light control touch switch 45 would cause a current flow through the timer circuit 60 from the battery 65 and thus cause the light bulb 15 to emit light thus illuminating the cassette tape well 20 and the cassette tape 25. When the operation was completed, the user would simply release the light control touch switch 45 and the light bulb 15 would deactivate. In the case of inadvertent operation, the timer circuit 60 would cause the light bulb 15 to deactivate after a preset time duration on the average of 45 seconds. If during intended prolonged use, for example while cleaning the tape heads, the timer circuit 60 would deactivate the light bulb 15, the user would simply release the light control touch switch 45 and then immediately press it again to reactivate the light bulb 15.

The foregoing description is included to illustrate the operation of the preferred embodiment and is not meant to limit the scope of the invention. The scope of the invention is to be limited only by the following claims.

What is claimed is:

1. A cassette tape illuminator for mounting upon a cassette player, the illuminator comprising:
   a. a light bulb;
   b. a mounting clip configured to attach the light bulb within a tape well of a cassette player;
   c. a slender, elongated cable;
   d. a component housing;
   e. a timer circuit disposed within the housing;
   f. a battery disposed within the housing and electrically connected to the timer circuit;
   g. the cable electrically connecting the timer circuit to the light bulb;
   h. a switch electrically connected to the timer circuit; and
   i. attachment means for removably attaching the housing and the switch to a cassette player.

2. The illuminator of claim 1, wherein the cable is of sufficient thinness to pass between a tape well window and a tape well lip when such a window is disposed in a covering manner over such a well.

3. The illuminator of claim 1, wherein the cable is thin.

4. The illuminator of claim 1, wherein the cable is ribbon shaped.

5. The illuminator of claim 1, wherein the cable is a ribbon cable.

6. The illuminator of claim 5, wherein the attachment means comprises a first double sided adhesive tape strip for attaching the housing to a cassette player, and a second double sided adhesive tape strip for attaching the switch to a cassette player.

7. An illuminated cassette tape player comprising:
   a. a light bulb disposed within a tape well of the cassette player;
   b. a slender, elongated cable passing between a tape well window and a tape well lip when the window is disposed in a covering manner over the well;
   c. a component housing attached to the cassette player;
   d. a timer circuit disposed within the housing;
   e. a battery disposed within the housing and electrically connected to the timer circuit;
   f. the cable electrically connecting the timer circuit to the light bulb; and
   g. a switch attached to the cassette player and electrically connected to the timer circuit.

8. An illuminated cassette tape player comprising:
   a. a light bulb disposed within a tape well of the cassette player;
   b. a slender, elongated cable passing into a tape well adjacent a tape well lip;
   c. a component housing attached to the cassette player;
   d. a timer circuit disposed within the housing;
   e. a battery disposed within the housing and electrically connected to the timer circuit;
   f. the cable electrically connecting the timer circuit to the light bulb; and
   g. a switch attached to the cassette player and electrically connected to the timer circuit.

* * * * *